Jan. 16, 1968 E. R. MILLER 3,363,406
FILTER COVER FOR COOKING AND PROCESS FOR
FILTERING COOKING BY-PRODUCTS
Filed April 5, 1965

INVENTOR.
EUGENIE R. MILLER
BY
Robert D. Rogers
ATTORNEY

3,363,406
FILTER COVER FOR COOKING AND PROCESS FOR FILTERING COOKING BY-PRODUCTS
Eugenie R. Miller, 10211 Dixon Ave.,
Inglewood, Calif. 90303
Filed Apr. 5, 1965, Ser. No. 446,483
1 Claim. (Cl. 55—384)

ABSTRACT OF THE DISCLOSURE

A flexible and porous inner area supported at its circumference by a heat resistant material comprising members which protrude and are directed towards the center of the inner area. The protruding members are connected by pleated areas so that the circumference of the outer area can be reduced for adjusting the size of the cover, so that it can accommodate a plurality of cooking utensils. As the circumference is reduced the protruding members project in a vertical direction and support the inner area in the vertical direction.

---

This invention relates to a disposable and adjustable cover for filtering cooking by-products.

Preparation of certain foods may involve frying, broiling, boiling or other applications of heat or energy to the food to place it in an edible form. During frying, for example, oil used in the process may be sputtered or expelled from the frying container. The same expulsion may also occur when broiling or boiling food products. Either food particles or the cooking component such as oil or water may escape or be expelled in some manner from the cooking area. The escaping particles have a tendency to collide with dust particles in the air and then adhere to the walls around the kitchen and particularly in the cooking area. If a fan or enclosed hood is used, the dust impregnated particles adhere to the fan and hood and exhaust tube. The particles create a dirty and unhealthy appearance. Extensive cleaning becomes necessary to eliminate the substance from the areas.

Devices have been developed to cope with the problem, but there are disadvantages associated with them. For example, one existing device is comprised of a lightweight, heat resistant metal having a circumferential area with a mesh filter of the same material comprising the interior portion of the device. While the device filters as intended, it is difficult to clean after use due to food particles becoming lodged or ensnared between the rigid ribbon-like portions of the mesh filter. Also, the device becomes hot and difficult to handle during use. Often over extended periods of use, the metal devices become warped or bent so that their effectiveness is somewhat impaired. The metallic filters have the inherent shortcoming that the filter mechanism is no better than the spacing of the interwoven region forming the mesh area. The air can still circulate the smaller oil or grease particles through the spacing of the filter.

The shortcomings of existing devices are minimized and the effects brought about by the dust impregnated particles are substantially reduced by the article described herein. As a result, the kitchen area projects a healthier and cleaner appearance to those persons who utilize it. The food is substantially freer from the dust impregnated particles which may settle on the food during and after preparation.

Briefly, the article includes a filter portion comprised of a porous, absorbent and lightweight material such as cloth, paper, etc. In a preferred embodiment, it is comprised of a paper product having a particular configuration depending on its intended use. The article includes a border or outer circumferential area providing rigidity and insulation to the filter area, if necessary. The border portion may be comprised of a lightweight metal such as aluminum foil, asbestos impregnated paper product, cloth, plastic material, or combinations thereof. In one embodiment, a cardboard type of paper may be covered by aluminum foil to form the border portion.

In a preferred embodiment, a handle portion for moving the article may be added.

The component parts of the article such as the paper comprising the filter and the foil or other material comprising the border portion are selected economically so that after one use the article may be discarded or disposed of.

In one embodiment of the article, the border and filter portions may be crimped or provided with pleats so that its size can be adjusted to fit containers of different sizes. For example, if the article has a circular configuration, by pleating, the outer circumference could be reduced to fit a smaller container. Therefore, it is an object of this invention to provide a lightweight, absorbent and porous filter for preventing expulsion of cooking by-products from a cooking container.

A further object of this invention is to provide a disposable cooking filter for absorbing food-like particles which escape during cooking.

A still further object of this invention is to provide an article comprising at least a porous paper filter portion for absorbing by-products of food prepared by heating.

These and other objectives and advantages of the invention will become apparent from the description contained herein taken in light of the figures of which:

Figure 1:
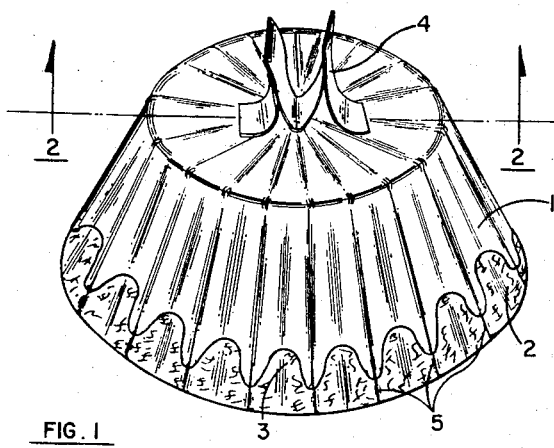
FIG. 1 is a representation of one embodiment of the article having an adjustable size.

Referring now to the FIG. 1 embodiment, wherein is shown the article in a circular configuration having filter portion 1 comprised of a lightweight, porous, absorbent material.

The material selected must be capable of maintaining sufficient rigidity to eliminate tearing or sagging into the food during cooking. It should also be somewhat flexible and inexpensive.

The filter is secured within outer portion 2 comprising a relatively more rigid material for supporting the filter portion and for resisting the heat of the energy source such as a stove burner. The border area may vary in width depending on the size of the article. Greater widths are required when the filter portion is larger in diameter. The FIG. 1 border includes the irregular inner edge 3 which provides rod-like or finger-like support for filter 1. Other embodiments may not require the inner edge.

In certain applications, it is advantageous to be able to adjust the size of the filter to fit smaller containers. The adjustability feature is incorporated into the FIG. 1 article by means of pleates or folds 5 extending radially from the center of filter portion 1.

Border area 2 may be folded at folds 5 to reduce the outer dimensions. As the outer border is reduced in size, the filter portion may form a slight canopy. Other means for incorporating folds different from that shown may be used. For example, the folds may be incorporated in the border portion only.

The filter cover may require lifting or moving from a container or to another location. Handle portion 4, shown affixed to filter 1, is included for that purpose. It may be comprised of the same material as the filter or some other lightweight material.

One preferred material for use as the filter are paper products such as the grades and types of paper used and commercially available as paper toweling. The toweling type of paper has both the absorbent and porous characteristics in addition to being lightweight and relatively inexpensive. It can be folded, bent, or otherwise manipulated without breakage or tearing. The fact that it is relatively inexpensive is an advantage when using it in a disposable configuration such as the article described herein.

In addition to the paper material, other materials such as a gauze-like cloth or other grades of cloth impregnated with an epoxy resin or other plastic material for imparting rigity to the cloth without interfering with its porous quality may be used.

In other embodiments, the filter portion may be strengthened by the addition of supporting narrow rib-like members (not shown). For example, paper having several plys may be used. The rib-like members may be added at specified intervals across either face portion of the filter. Since porosity is reduced in the areas of the supports, care must bt taken not to include a substantial number.

Porous and absorbent paper as a filter material has the advantage that for most applications it tends to be buoyed or supported by the steam. A heavier material might absorb oil, tear and fall into the cooking container. The outer circumference area 2 contacts the surface of the container. As a result, those portions are subjected to larger quantities of heat by conduction through the container walls than is the filter portion. Because of the tendency to overheat, the outer areas preferably are comprised of a material or design having the capability for absorbing larger quantities of heat than the filter material. The absorbent and porous properties are not required for the outer portion as is the case for the filter portion. The outer areas are intended to serve as a support and to strengthen the filter portion.

The outer area may be comprised of an aluminum foil type material commercially available as foil used in homes and in the kitchen area.

In another embodiment, several plys of an asbestos impregnated paper may be used. The number of plys are determined by the rigidity and strength needed to support the filter portion.

In securing the filter to the outer area, the outer area may be glued, crimped, stapled or otherwise joined to the filter portion. For example, if aluminum foil as the outer area and paper for the filter is used, crimping after the paper is pulled tight secures the filter inside the foil.

The handle may be stapled, glued or otherwise attached to the cover so that it has sufficient adherence to the outer area to lift it.

Figure 2:
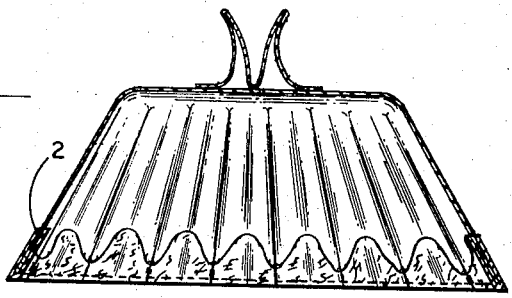
FIG. 2 is a cross-sectional view of FIG. 1 taken along lines 2—2.

FIG. 2 is a cross-sectional view of the FIG. 1 embodiment showing the outer border as it appears on the inside of the filter including folds 5 and edges 3 providing extra support to the filter portion 1.

Figure 3:
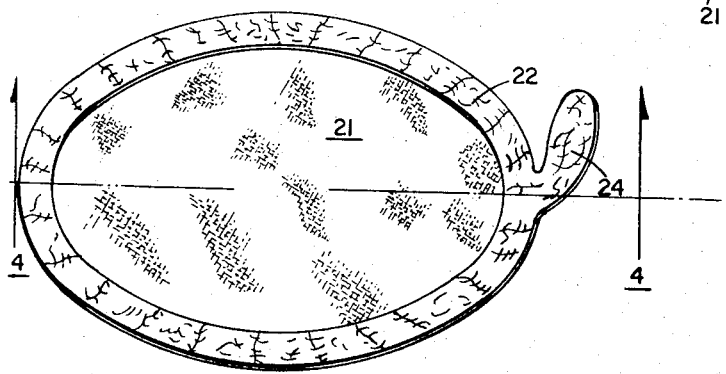
FIG. 3 is a perspective view of a second embodiment of the article for covering a container.

Referring now to FIG. 3 wherein is shown a second embodiment of the filter cover. The embodiment is similar to the FIG. 1 embodiment except that the outer area 22 and the filter 21 is not pleated or folded, and the handle 24 is an integral part of outer area 22. This embodiment is adapted to cover a container by resting on the container's raised edges. The handle for such uses is more accessibly located on the outer portion. The handles in FIGS. 3 and 5 are turned up although in other embodiments they may be bent into other positions or not bent at all.

Figure 4:
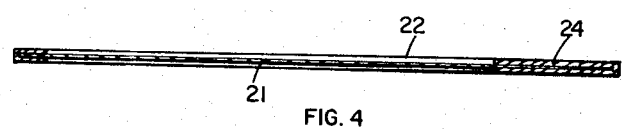
FIG. 4 is a cross-sectional view of FIG. 3 taken along lines 4—4.

The cross-sectional view shown in FIG. 4 illustrates the overlapping aspect of the outer area and the handle extending in an unbent position.

Figure 6:
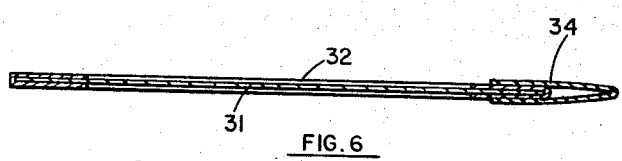
FIG. 6 is a cross-sectional view of FIG. 5 taken along lines 5—5.
Figure 5:
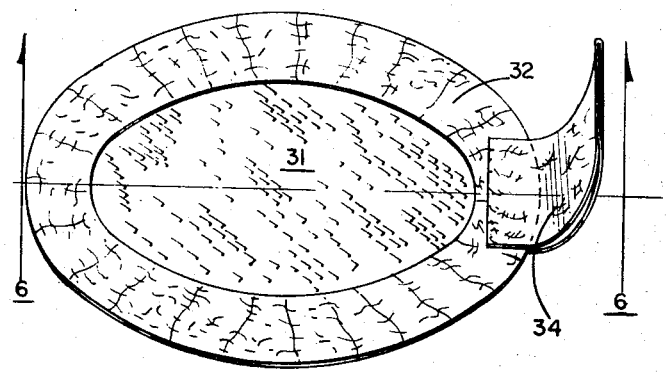
FIG. 5 is a perspective view of a third embodiment of the article.

The FIG. 5 and cross-sectional view shown in FIG. 6 are different from the FIG. 4 embodiment in that handle 34 is not an integral part of the outer area 32 as was the case for handle 24.

Materials and processes for producing and combining the materials for all the embodiments are substantially the same as discussed in connection with the FIG. 1 embodiment.

If a particular use warrants, a rigid border could be provided for the outer circumference, for example, by incorporating a circular ring of lightweight metal, plastic or rolled paper in the border area.

Although the invention has been described and illustrated in detail, it is to be understood that the same is by way of illustration and example only, and is not to be taken by way of limitation; the spirit and scope of this invention being limited only by the terms of the appended claim.

I claim:
1. A filter cover consisting of an inner filter portion comprising a porous absorbent filter material for absorbing gaseous by-products of food prepared by heat;

an outer border portion secured to said inner filter for providing rigidity to the inner filter, said outer border being comprised of a heat resistant material for shielding said inner area from said heat, and wherein said outer border has a plurality of protruding members connected to the inner filter for providing supporting members directed radially towards the center of the inner filter, said protruding members having a common base with a portion of said inner filter, said protruding members being separated from each other at the termination thereof, said inner filter further having a plurality of pleats interposed between each of said protruding members so constructed that the circumference of said filter cover is reduced when the pleats are folded, and the inner filter projects in a general vertical direction and the protruding members provide vertical support for said inner filter.

References Cited
UNITED STATES PATENTS

| | | | |
|---|---|---|---|
| 2,546,874 | 3/1951 | Siegrist | 210—477 X |
| 2,568,637 | 8/1951 | Jardim | 55—384 |
| 2,587,773 | 3/1952 | Sell et al. | 55—384 |
| 2,664,169 | 12/1953 | Misener et al. | 55—384 |
| 2,687,026 | 8/1954 | Gleason | 55—384 X |
| 2,999,559 | 9/1961 | Boyer | 55—384 |

FOREIGN PATENTS

| | | |
|---|---|---|
| 14,488 | 11/1885 | Great Britain. |

SAMIH N. ZAHARNA, *Primary Examiner.*

REUBEN FRIEDMAN, *Examiner.*

J. ADEE, *Assistant Examiner.*